United States Patent

[11] 3,571,963

| [72] | Inventor | Martin V. Ledbetter |
| | | 1714 Quillian, Pueblo County, Colo. 81004 |
| [21] | Appl. No. | 785,678 |
| [22] | Filed | Dec. 20, 1968 |
| [45] | Patented | Mar. 23, 1971 |

[54] HOOK-SETTING ACCESSORY FOR FISHING POLE
2 Claims, 4 Drawing Figs.

[52] U.S. Cl. .................................................. 43/16
[51] Int. Cl. .......................................... A01k 97/00, A01k 97/12,
[50] Field of Search .......................................... 43/15, 16

[56] References Cited
UNITED STATES PATENTS

| 2,638,696 | 5/1953 | Derkovitz .................. | 43/15 |
| 2,795,072 | 6/1957 | Porter ....................... | 43/16 |
| 2,917,858 | 12/1959 | Ikeuchi ...................... | 43/17 |
| 3,055,135 | 9/1962 | Lewis ........................ | 43/15 |
| 3,104,485 | 9/1963 | Wallingford ................ | 43/15 |

FOREIGN PATENTS

| 1,296,871 | 5/1962 | France ....................... | 43/15 |

Primary Examiner—Samuel Koren
Assistant Examiner—Daniel J. Leach
Attorney—Richard W. Hanes

ABSTRACT: The present invention comprises a frame for holding a fishing rod and having a quick acting solenoid whose vertically moving armature strikes the rod to impart a sharp upward thrust to the end of the rod in response to a first downward pull on the rod tip for the purpose of setting the hook in a fish's mouth.

PATENTED MAR23 1971　　3,571,963

INVENTOR
MARTIN V. LEDBETTER
BY
*Richard W Hansen*
ATTORNEY

HOOK-SETTING ACCESSORY FOR FISHING POLE

The present invention relates generally to the sport of angling and more precisely to an accessory for use with a fishing rod that will automatically set the fishing hook in the mouth of the fish.

Successful angling requires a sensitive and quick response to the physical indications that a fish is nibbling or striking at the bait offered by the fisherman. Oftentimes older or less experienced sportsmen fail to achieve or maintain the dexterity required to provide the subtle and precisely timed response to the rod tip necessary for setting the hook.

It is therefore the principle object of this invention to provide a mechanical means for detecting slight tension on the fishing line and to impart a sharp but suddenly arrested pull on the fishing line in order to set the hook.

A preferred form of the invention is illustrated in the accompanying drawings in which.

A standard casting rod 5 may be taken as exemplary of the fishing tackle which may be employed in accordance with the teachings of this invention. Such a rod 5 is illustrated as being detachably mounted on the top of a frame 7. The frame may take many forms or dimensions, but has for its primary purpose the mounting of the fishing rod and the housing of the mechanical hook-setting device which will now be described.

At the outer end of the frame 7 an electric solenoid 17 is mounted so that the solenoid armature 19 moves in a vertical plane coincident with the plane of the rod 5. When the solenoid is energized, the armature 19 moves sharply upwardly, striking the rod and imparting a quick upward thrust to the tip thereof in a motion designed to set the hook.

Figure 1:
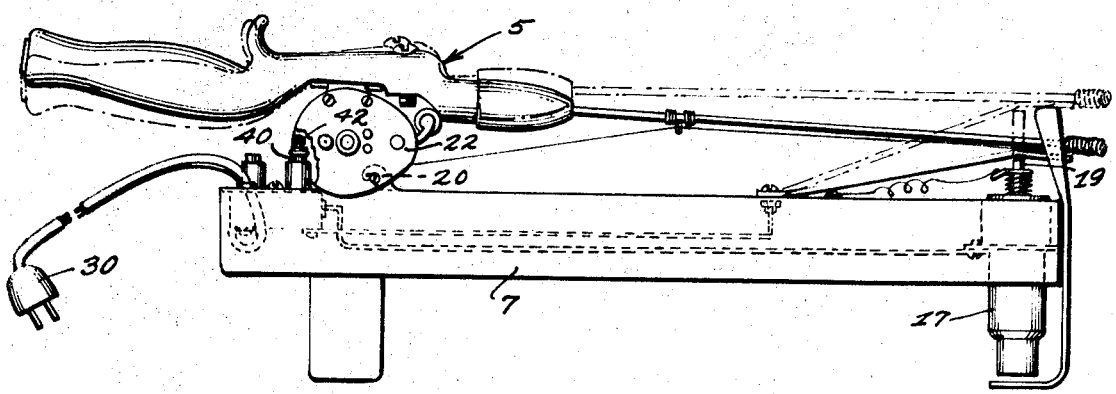
FIG. 1 is a side elevational view of the fishing accessory of the present invention showing a fishing rod mounted thereon and showing a second portion of said fishing rod in phantom.
Figure 2:
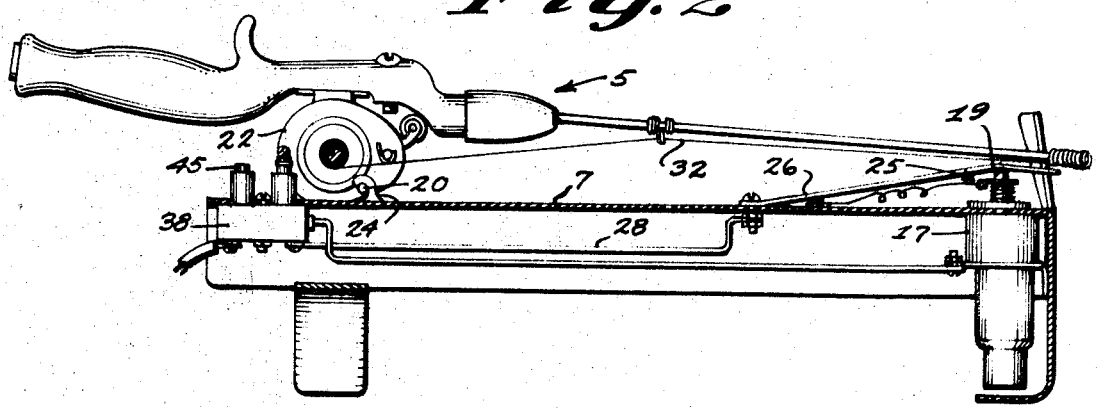
FIG. 2 is a cross-sectional view of the frame of the fishing accessory.
Figure 3:
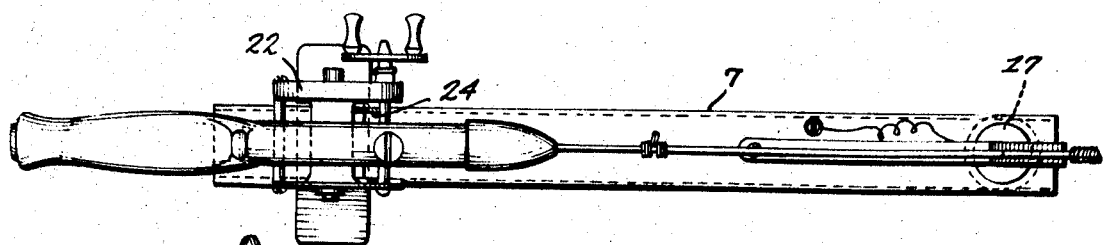
FIG. 3 is a top plan view of the apparatus of the present invention.
Figure 4:
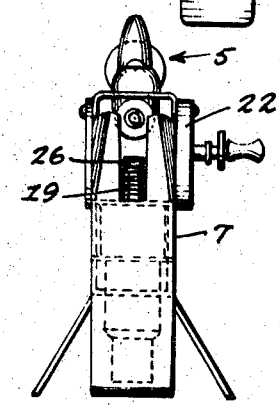
FIG. 4 is a front elevational view of the apparatus of the present invention.

In order to facilitate movement of the rod in response to the thrust of the solenoid armature, a forward spacer bar 20 of the fishing line reel 22 is pivotally secured beneath the overhang of a pair of spaced anchor tabs 24 connected to the rear portion of the frame 7. Thus, when the tip of the rod is raised by the solenoid armature 19, the entire rod pivots about the spacer bar 20 as a center, as shown by the phantom lines of FIG. 1.

To energize the solenoid there is provided a source of electrical power, such as a battery (not shown) and a switch 25 for closing the circuit in response to tugs on the fishing line. The switching means may take many forms; however, a simplified pair of switch contacts may be formed as shown in the drawings. A springable metal strap 26 is bolted to the frame 7 and extends over the solenoid armature 19. The spring bias of the strap provides a rest for the rod and resists downward motion thereof to a slight extent. The strap also serves as one contact of the switch as it is connected by appropriate wiring 28 to the battery or other power source through a plug 30. The other switch contact is provided by the armature itself so that when the springable strap 26 is depressed far enough by momentary downward pull on the rod tip, contact will be made between the strap 26 and the solenoid armature 19, thus completing the circuit between the power source and the coil of the solenoid 17.

Any tension on the line 32 which results in a pivotal motion of the rod around the spacer bar 20 and a lowering of the rod tip a sufficient distance to close the switch contacts 25 will cause the solenoid 17 to be energized. When the solenoid armature 19 strikes the end of the rod 5 the fishing line 32 is jerked in such a manner as to properly set the hook but not to pull it completely out of the mouth of the fish.

Included in the embodiment of the invention shown in the drawings is an audible alarm means 38 for signaling the fisherman when the solenoid has been energized. A pushbutton switch 40 is mounted on the frame just beneath a rear spacer bar 42 on the reel. When the rod tip is raised and the pole pivots, the rear spacer bar 42 depresses the switch 40 and actuates the alarm 38. A reset button 45 is provided to turn the alarm off and recock the switch 40.

Having thus described the several useful and novel features of the present invention in connection with the accompanying drawings, it will be seen that the many worthwhile objectives for which it was designed have been achieved. Although but a few of the several possible embodiments of the invention have been illustrated and described herein, I realize that certain additional modifications may well occur to those skilled in the art within the broad teaching hereof; hence it is my intention that the scope of protection afforded hereby shall be limited only insofar as said limitations are expressly set forth in the appended claims.

I claim:

1. A fishing rod holder and actuator comprising in combination:

an elongated frame for carrying a fishing rod, said frame being substantially the same length as the rod and including;

means mounted near one end of the frame for pivotally securing the rod to the frame;

an electrical solenoid having a coil and a reciprocating armature, said solenoid mounted near the other end of said frame and disposed and placed so that the armature is reciprocable in a vertical direction and is located beneath the position of the tip of the said fishing rod;

spring means attached to the frame and disposed above and normally out of contact with said armature and beneath the tip of the said rod so as to serve as a springable support for the rod;

means interconnecting said spring means and said solenoid coil and armature in a series electrical circuit;

the said circuit having switch means provided by the said spring means and armature as contacts thereof; and the said spring means being biased by vertical movement of said rod into contact with said armature to energize the solenoid and move the armature upwardly to strike the rod, thus imparting an upward thrust to the rod tip to set the hook in the fish's mouth.

2. The combination of claim 1 and further including alarm means responsive to pivotal motion of said rod.